Patented Feb. 2, 1937

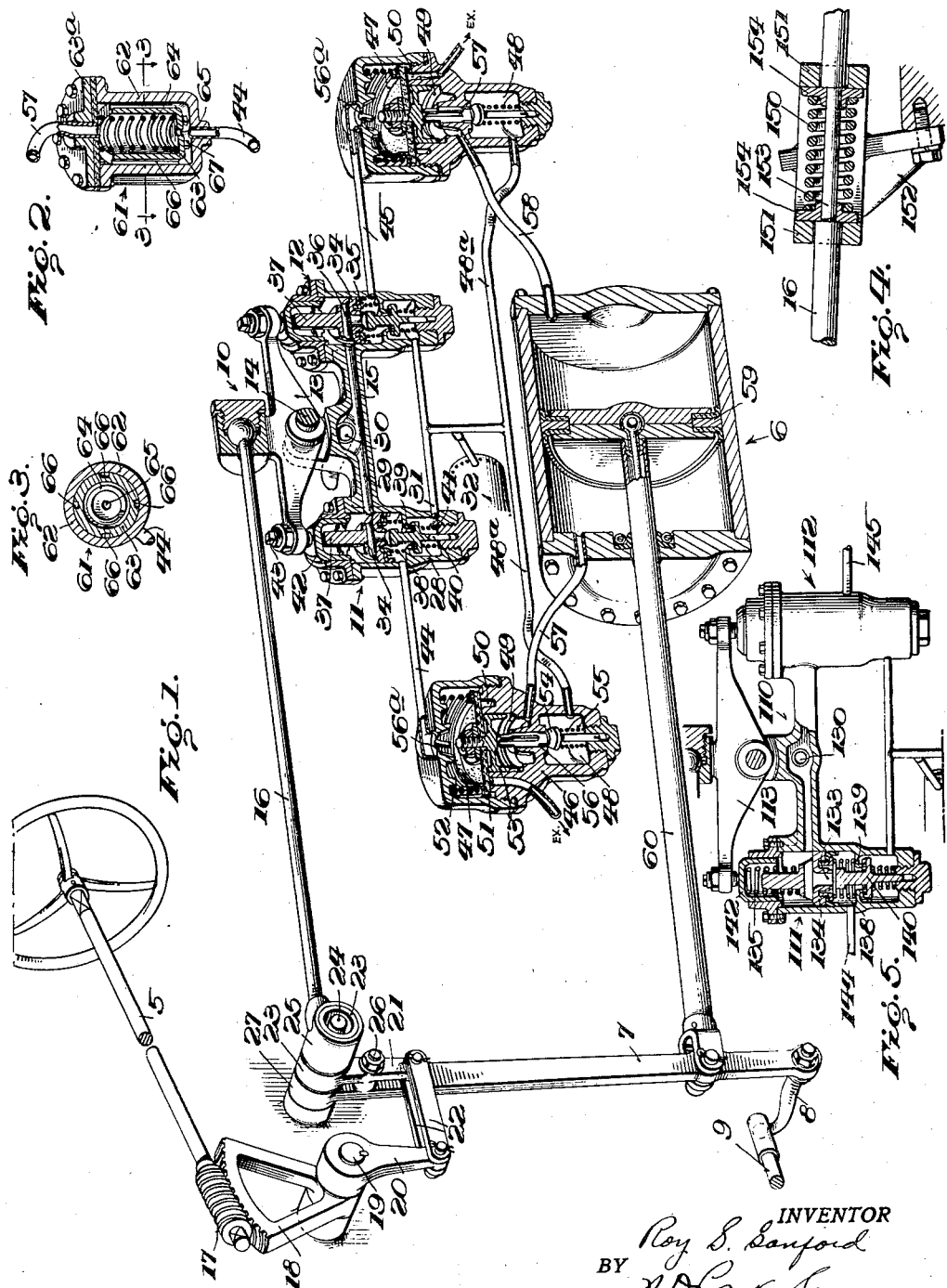

2,069,540

UNITED STATES PATENT OFFICE 2,069,540

STEERING MECHANISM

Roy S. Sanford, New York, N. Y., assignor to Bendix-Westinghouse Automotive Air Brake Company, Pittsburgh, Pa., a corporation of Delaware Application May 31, 1934, Serial No. 728,405

15 Claims. (Cl. 180—79.2)

This invention relates to steering mechanisms and more particularly to such mechanisms of the power-operated type especially adapted for use in connection with motor vehicles.

It has heretofore been proposed to utilize power-operated manually-controlled steering mechanisms for use in connection with dirigible wheels of motor vehicles and the use of such mechanisms has resulted in substantially reducing the manual effort necessary to be exerted by the operator in steering such vehicles, to the end that more efficient handling of such vehicles may be effected, especially under conditions of heavy traffic where the vehicle speed is necessarily low and a greater effort would be otherwise required for steering. In such prior installations of this type, however, and in instances where the power steering mechanism includes a fluid motor, there has been a tendency for the power means to accentuate oscillations or vibrations of the dirigible wheels caused by the usual shocks encountered during operation due to road conditions or to the mechanical condition of the steering gear equipment of the vehicle. This tendency has been found to exist where the power operation of the steering mechanism is effected by a motor controlled by fluid under pressure, the aggravation of the oscillation condition of the vehicle wheels being due in part to a reversal of the operating condition of the power steering device, that is from a motor to an engine.

It is accordingly one of the objects of the present invention to provide a power-operated steering mechanism so constituted as to avoid the oscillation tendencies in steering mechanisms of the type heretofore utilized.

Another object of the invention is to provide a novel power-operated manually-controlled steering mechanism for motor vehicles so constituted that power steering may be effected in a novel and efficient manner.

Still another object is to provide in a mechanism of the above character novel means for absorbing and damping the road shocks encountered by the dirigible wheels of the vehicle whereby all oscillations or shimmy thereof will be effectively eliminated.

A further object is to provide a power-operated steering mechanism so arranged as to be capable of ready installation upon vehicle steering mechanisms of the type now in use and so constituted as to not only provide power steering for the vehicle but also to provide an effective means for damping and absorbing oscillations or shimmy of the dirigible wheels due to mechanical defects in the steering linkage.

A still further object of the invention is to provide in a mechanism of the above character, including a fluid pressure-operated motor, a novel means whereby road shocks imparted to the power steering mechanism will be rapidly damped, the mechanism being so arranged as to provide efficient and readily operable power steering.

A still further object is to provide a novel arrangement of parts in a mechanism of the above character so constituted as to be capable of ready installation and repair, economical of manufacture, positive in operation and capable of being manually operated in the event of failure of power.

Other objects and advantageous features of the invention will appear more fully hereinafter from the following detailed description when taken in connection with the accompanying drawing, wherein several embodiments of the invention are illustrated. It is to be expressly understood, however, that the drawing is for purposes of illustration only and is not designed as a definition of the limits of the invention, reference being had for this purpose to the appended claims.

In the drawing, wherein similar reference characters refer to similar parts throughout the several views:

Fig. 1 is a perspective view, partly in section, of a power steering mechanism constructed in accordance with the present invention;

Fig. 2 is a perspective sectional view of a valve mechanism which may be employed in lieu of certain parts disclosed in Fig. 1;

Fig. 3 is a sectional view of the valve shown in Fig. 2;

Fig. 4 is an enlarged view of a damping mechanism which may be employed, and

Fig. 5 is a side view, partly in section, of a modified form of controlling valve mechanism.

Referring more particularly to Fig. 1, the present invention is disclosed therein as including a manually-operable steering column 5 adapted to control the flow of fluid power to a double-acting motor 6 which, upon actuation in either direction, is adapted to effect oscillation of a power-operated pitman or steering arm 7 having a connection 8 to the drag link 9 of a conventional type of steering mechanism.

Means are provided for controlling the application of fluid to the motor 6 and as shown such means are manually operated through rotation of the steering column 5 in either direction. As shown, a valve mechanism 10 comprising similar valve devices 11 and 12 is adapted to be selectively operated by a rocker arm 13 pivotally connected as by means of a pin 14 to a stationary casing 15, the rocker 13 being suitably connected to an actuating rod 16 which is adapted to be reciprocated longitudinally in either direction. In order to effect such reciprocation of the valve control rod by the steering column 5, the latter is provided with a worm 17 meshing with a worm segment 18 which latter is suitably secured to shaft 19 rotatably mounted in the vehicle frame. Also secured to the shaft 19 is an arm 20 which is associated with a valve control lever 21 as by means of links 22 pivotally connected to one end of each of the members 20 and 21. The latter is provided at its opposite end with a hub portion 23 extending laterally and surrounding but spaced from a stationary stub shaft 24, the hub 23 being adapted to rotatably receive a sleeve 25 suitably secured to one end of the valve control rod 16. In order to associate the valve control lever 21 and the power-operated steering arm 7, these two members are pivotally connected intermediate their ends as by means of a pin 26, the upper extremity of the steering arm 7 being formed as a hub 27 surrounding and journaled on the stub shaft 24. The steering linkage above described is more particularly shown in the patent to Eaton et al. No. 1,938,745, dated December 12, 1933.

The above arrangement is such that movement of the steering column 5 in one direction will effect oscillation of the valve control lever 21 about the pivot 26 to effect operation of the valve mechanism 10 to control application of fluid to the motor 6 in such a manner that power-operated movement of the steering arm 7 will tend to move pivot 26 in a direction to permit valve-closing movement of the lever 21.

Movement of the steering column 5 in the other direction will cause a reversal of the above described movements, it being borne in mind that as soon as the fluid motor 6 becomes operative, the movement of the steering arm 7 is in such a direction as to constantly tend to discontinue the supply of fluid power to the motor.

In order to effectively control the flow of fluid to the motor 6, each of the valves 11 and 12 comprises a casing 28, one portion of which is adapted to communicate through an exhaust passage 29 with an atmospheric port 30, while another portion is adapted to communicate through an intake passage 31 with a reservoir of fluid under pressure 32. Slidably mounted within the valve casing is a reciprocating piston element 34 provided with an exhaust port 35 communicating with a transverse passage 36 in constant communication with exhaust passage 29. The element 34 is resiliently urged upwardly as shown as by means of a spring 38, the same being confined between the said element and a portion 39 of the casing 28. The portion 39 forms an inlet port which is normally closed by means of a combined inlet and exhaust valve 40 resiliently urged as by means of a spring 41 to the position shown where the space below the piston communicates with the atmosphere and wherein such space is cut off from the intake passage 31. The piston 34 is provided with a stem 37 in constant engagement with a cap 42 which is engaged by the adjustable screw 43 carried by the rocker 13, the construction being such that each of the springs 38 of the valves 11 and 12 tends to center the rocker 13 and thus maintain the above described valve parts in the position shown in Fig. 1.

From the above, it will be readily understood that upon operation of the valve 11, for example, depression of the member 42 will move element 34 downwardly to contact valve 40 to close off the exhaust port 35 and open the intake 39, thereby permitting fluid under pressure to flow into the valve chamber beneath the piston and effecting a reaction in opposition to the force applied to operate the valve, the chamber beneath the piston being suitably associated through conduits 44 and 45 with mechanism for supplying fluid under pressure to the fluid motor 6, as will appear more fully hereinafter.

In order to supply fluid under pressure to the motor 6 at such a rate that the operation of said motor will be most efficient not only during normal steering conditions but also during conditions when the steering mechanism is subjected to road shocks or other disturbing oscillations, a fluid pressure-operated relay valve is interposed between each of the control valves 11 and 12 and opposite ends of the motor 6, each of the relay valves being of similar and well-known construction. As shown, each of these valves includes a casing 46 having a fluid-receiving or actuating chamber 47, an intake chamber 48, an outlet chamber 49 and an exhaust chamber 50, the actuating chamber 47 and exhaust chamber 50 being isolated as by means of a flexible diaphragm 51, the peripheral portion of which is resiliently urged to the position shown as by means of spring 52. To the central portion of the diaphragm 51 is secured a spider-like member 53 slidably mounted in the chamber 49, the said member being normally in contact with the end of an intake valve 54, the latter being normally resiliently urged as by means of spring 55 into engagement with a seat 56 formed in the casing 46. The valve 54 is provided with a fluted shaft 57 so constituted as to permit fluid under pressure to flow from chamber 48 to chamber 49 when valve 54 is opened. Each of the conduits 44 and 45 communicates with the chambers 47 of the relay valves and one of the features of the present invention resides in the provision of means for retarding the flow of fluid under pressure to said chambers under conditions when valve operation is effected by an oscillating tendency of the steering mechanism. Such means may take the form of choking devices 56ᵃ positioned in the conduits or in the caps of the relay valves, this construction serving to retard the rate of flow of fluid to the relay valves and permitting a rapid build-up of pressure beneath the pistons 34 of the valves 11 and 12 under the above mentioned conditions. Each of the intake chambers 48 communicates through conduits 48ᵃ with the reservoir 32 while each of the outlet chambers 49 of the relay valves communicates through conduits 57 and 58 with opposite ends of the motor 6, the latter slidably receiving piston 59 provided with a rod 60 suitably connected to the steering arm 7.

With the above named construction, normal manual operation of the steering column in such a direction as to provide actuation of valve 11 will effect a downward movement of the valve element 40 as heretofore set forth, thus establishing communication between the reservoir 32 and the space beneath the piston 34. Fluid pressure then flows through conduit 44 to chamber 47 of the relay valve to flex the diaphragm 51 downwardly to effect an opening of valve 54 through movement of the guide member 53 secured to the diaphragm, and when opening of the valve occurs, fluid under pressure will be conducted from reservoir 32 through conduit 48ᵃ to the chambers 48 and 49 and thence to the left-hand side of the motor 56 through conduit 57. It will be observed that the relay valve is of the reactionary type, since the pressure in chamber 49 constantly tends to move the diaphragm 51 upwardly against the force applied, to permit valve 54 to be closed by the spring 55. As soon as sufficient pressure has been accumulated in the motor 6 to move the piston 59 to the right as viewed in Fig. 1, the steering arm 7 will be moved in a counterclockwise direction about shaft 24, and through pivot 26 will tend to move the rod 16 to the right, lessening the force applied to valve 11 and permitting the latter to lap.

One of the features of the present invention, as heretofore pointed out, resides in the abrupt dampening of shocks imparted to the steering mechanism due to oscillations of the dirigible wheels. For example, if an external shock is imparted to the steering arm 7 in such a direction as to tend to cause the same to be moved in a counterclockwise direction about the shaft 24, the valve rod 16 will be abruptly moved to the right to operate the control valve 12. This valve will instantly be opened and the pressure build-up beneath the piston 34 of this valve will be so rapid, due to the choking action of device 56ᵃ, as to exert a reaction to the applied force in such a direction as to tend to move the valve rod 16 to the left and this action takes place substantially simultaneously with the application of the shock to the arm 7. Thus most of the shock will be absorbed at the steering worm 17 through the pivot 26, arm 21 and connections 22, 20, 19 and 18. It will also be observed that during the above mentioned condition, the fluid under pressure admitted to the relay valve through conduit 45 will actuate the said valve to supply fluid under pressure to the right-hand end of the actuator 6 through conduit 58, but since the operation of the relay valve is delayed somewhat by reason of the restricted communication between such valve and the control valve, the slight build-up of pressure to the right of piston 59 will not actually move the piston to the left to tend to move the arm 7 in that direction which might cause movement of the valve rod 16 to the left to open valve 11 to produce an oscillating condition of the steering arm, but will merely serve to cushion the movement of the piston 59 to the right due to the initial shock.

Thus it will appear from the above that during normal manual operation of the steering mechanism controlling member, when the rate of fluid flow through the valve devices is relatively low, the restrictions 56ᵃ will not appreciably impede the flow of fluid, nor will the rate of pressure build-up beneath the pistons 34 of the valves 11 and 12 be sufficient as to affect proper manual control. On the other hand, when the valves 11 or 12 are abruptly and widely opened due to a condition of road shock or shimmy, the action of the steering device will be as heretofore set forth, due to the relatively rapid rate of fluid flow, the rapid build-up of pressure beneath pistons 34 and the restrictions 56ᵃ.

A slightly modified form of the invention is disclosed in Fig. 2 and in this form an automatically-operable variable check valve is employed between the control valves and the motor in lieu of the relay valves shown in Fig. 1. As shown, Fig. 2, the construction provides a choke valve 61 constituted by a casing 62 provided with a cap 63ᵃ, the latter having an outlet opening communicating with one end of the fluid motor through conduit 57, the main casing portion 62 being provided with an inlet opening communicating through conduit 44 with the control valve 11. The choking element of the valve 61 is constituted by a cup-shaped member 63 slidable within the casing and normally resiliently urged to the position shown as by means of a spring 64. The member 63 is provided with a small centrally-disposed opening 65 and a plurality of slots 66 positioned in the side wall thereof, the member 63 being provided with a plurality of spaced stops or projections 67 which enable communication between conduit 44 and slots 66, which latter communicate with the outlet conduit 57 by reason of the opposite end of member 63 being normally spaced from the valve casing. It will be understood that one such valve 61 is to replace each of the relay valves in the system disclosed in Fig. 1.

In the operation of the modified form of the invention including the variable choking valves 61, when either of valves 11 or 12 is operated and fluid under pressure flows through lines 44, 45 to one of the valves 61, the flow of fluid under pressure therethrough to the fluid motor can only take place through the restricted opening 65 and the slots 66 provided in the valves 61. Moreover, the position of the member 63 of said valve will depend upon the pressure differential existing in conduits 44 and 57 which in turn is dependent upon the rate of flow of fluid through the valves 11 or 12. Thus, as the rate of flow of fluid through such valves increases, the element 63 thereof will be moved in opposition to the tension of spring 64 to gradually close off the passages at the sides of the element 63 until such a condition is reached wherein the upper end of the member 63 contacts the casing. At this time all fluid to the motor must pass through the restricted opening 65. It will thus be observed that the rate of build-up of pressure in the fluid motor will be dependent upon the rate of flow of fluid through the control valve mechanisms. The advantages of such a construction will be readily appreciated when it is considered that the rate of flow of pressure through the control valves will be high when a violent shock is imparted to the steering mechanism and by reason of the automatic choking action of the valves 61, the pressure build-up beneath the pistons in the control valves will exert a substantial simultaneous reaction to the application of the shocking force as to abruptly damp out or counteract the same in a manner similar to the operation of the construction described in connection with Fig. 1. However, in normal operation, the rate of fluid flow is relatively low, and hence the automatic choking action will not be utilized.

A slightly modified form of the valve mechanism 10 which may be advantageously employed is shown in Fig. 5 at 110. This valve construction may be readily substituted for the valve 10 shown in Fig. 1 and may be utilized with or without the relay valves shown in said figure, it being understood, however, that choking devices similar to those shown at 56 in Fig. 1 are employed in any event. More particularly, the valve mechanism 110 comprises similar valve devices 111 and 112 of the reactionary type, that is of such a nature that fluid pressure will be admitted to an element of the valve when the valve is opened and such pressure will exert a reaction to the force tending to hold the valve open, to such a degree that the valve will become lapped as soon as the pressure beneath the element is equal to or slightly greater than the applied pressure. As shown, each valve device is similar to the corresponding valve device of Fig. 1 with the exception that the piston element 134 is actuated through a suitable resilient device such as a spring 135, interposed between said piston and the cap 142 with which the rocker arm 113 is in engagement. The spring 138 beneath the piston normally maintains the latter in such a position as to communicate the conduit 144 with exhaust opening 130 through open port 133. Thus both sides of the actuator 6 are normally open to exhaust through the conduits 144, 145 or in the event that the relay valves shown in Fig. 1 are employed, said relay valves are normally connected with atmosphere through conduits 144, 145 as above described.

From the above, it will be appreciated that upon operation of the valve 111 for example, due to a road shock or similar condition, depression of member 142 will move the piston element 134 through spring 135 to contact valve 140 to close off the exhaust port 133 and open the intake 139, thereby permitting fluid under pressure to flow into the valve chamber beneath the piston and effecting a reaction in opposition to the force applied to operate the valve. Since the rate of flow of fluid through conduit 144 to the actuator 6 is retarded by the choking device interposed therein, the rate of pressure build-up beneath the piston 134 will be relatively rapid. This action will tend to move the piston upwardly to react against the applied force to close off the intake port 139. Thus in the event that the steering mechanism receives a shock tending to operate either of the valve mechanisms 111 or 112, the opening of said valves and the rapid lapping thereof will take place as above described and a substantially small pressure will be built up in the actuator. This building up of pressure in the actuator is delayed somewhat in view of the restrictions between the valves and actuator and accordingly the same effectively serves to cushion the movement of the piston of said actuator due to such shock. The latter is thus completely and effectively damped and no undesirable oscillation of the power steering mechanism will result.

In Fig. 4, disclosing a different modification of the invention, a spring loaded device 150 is associated with the valve control rod 16 for the purpose of maintaining the rod in neutral position and exerting a predetermined resistance to movement of the rod in either direction when the steering mechanism is subjected to shocks or vibrations. More particularly, the rod 16 projects through a pair of stationary arms 151 suitably carried by a bracket 152, and the spring 150 surrounds a reduced portion 153 of said rod, each end of which bears against washers 154. With such an arrangement, movement of the rod 16 in either direction is resisted by the spring, which preferably is assembled with a slight degree of loading.

There have thus been provided by the present invention a number of novel power steering gear constructions which are so arranged as to function to effectively arrest and damp any oscillations of the steering mechanism due to road shocks or other conditions wherein operation of the power apparatus is effected independently of the usual manual control. While such constructions effectively perform the above function, it will be observed that during normal manually-controlled power steering, the apparatus will operate efficiently and without any appreciable damping which might otherwise effect a delayed response to manual control.

While several embodiments of the invention have been disclosed and described herein, it is to be understood that various changes may be made, as well understood by those skilled in the art, such as omission of certain parts, rearrangement of elements and other variations, without departing from the spirit of the invention. For example, the restrictions between the control valves and relay valves may be positioned in other locations than that disclosed, while additional choking devices may be inserted in each end of the power cylinder if desired. Reference will, therefore, be had to the appended claims for a definition of the limits of the invention.

What is claimed is:

1. In a manually-controlled power-operated vehicle steering mechanism of the type embodying a fluid motor, the combination with said motor, of means for controlling the flow of fluid thereto and for dampening movement of said steering mechanism caused by road shocks comprising a fluid-operated valve mechanism, valve means for controlling the flow of fluid to said valve mechanism, and manually-operable means for controlling said valve means.

2. In a power-operated steering mechanism for vehicles having an oscillatable steering arm, a fluid motor operatively connected with said arm, and means for supplying fluid to said motor and for dampening movement of said steering arm caused by road shocks comprising a fluid-operated valve mechanism, valve means for controlling the flow of fluid to said valve mechanism, and means including a manually-operable lever fulcrumed on said steering arm for actuating said valve means.

3. In a power-operated steering mechanism for vehicles having an oscillatable steering arm, a fluid motor operatively connected with said arm, a manually-controlled valve mechanism operable to establish a flow of fluid thereto, and means subjected to the fluid flow from said valve mechanism for controlling the flow of fluid to said motor and for dampening operation of the latter caused by road shocks.

4. In a steering mechanism for motor vehicles having a power-operated steering arm, a fluid power motor operatively connected with said arm, operator-controlled means for establishing a predetermined fluid pressure differential, means subjected to said predetermined fluid pressure differential for applying fluid to said motor and for dampening operation of the latter caused by road shocks, and means for restricting communication between said operator-controlled means and said second named means.

5. In a power-operated steering mechanism for vehicles having an oscillatable steering arm, a fluid motor operatively connected with said arm, relay valve means for supplying fluid to said motor, manually-controlled valve mechanism for controlling the flow of fluid to said relay valve means, and means for dampening movement of said steering arm caused by road shocks comprising means for retarding operation of said relay valve means.

6. In a power-operated steering mechanism for vehicles having an oscillatable steering arm, a fluid motor operatively connected with said arm, relay valve means for supplying fluid to said motor, manually-controlled valve mechanism for controlling the flow of fluid to said relay valve means, and means for dampening movement of said steering arm caused by road shocks comprising means interposed between said valve mechanism and said relay valve means for retarding the operation of the latter.

7. In a power-operated vehicle steering mechanism having a power-operated steering arm, a fluid pressure-operated motor operatively connected with said arm, a fluid pressure-controlled valve mechanism for establishing a flow of fluid under pressure to said motor, manually-operable valve means for controlling the flow of fluid under pressure to said valve mechanism, and means for dampening movement of said steering arm caused by road shocks comprising means associated with the valve mechanism for retarding the flow of fluid under pressure thereto.

8. In a power-operated steering mechanism for motor vehicles having a steering arm, a fluid pressure-operated motor operatively connected with said arm, a manually-operable lever pivotally connected with said arm, and means for controlling the flow of fluid under pressure to said motor to effect power operation of said arm, said last named means including a valve mechanism having a movable pressure-responsive element therein subjected to the pressure of the fluid conducted to said motor, opposed resilient means acting on said element to normally maintain said valve inoperative, and means associated with said lever for actuating said element through one of said resilient means.

9. In a power-operated steering mechanism for motor vehicles having a steering arm, a fluid pressure-operated motor operatively connected with said arm, means for controlling the flow of fluid under pressure to said motor including a valve mechanism having a movable pressure-responsive element therein subjected to the pressure of the fluid conducted to said motor, manually-operable means associated with said arm for operating said valve mechanism, and resilient means interposed between said manually-operable means and said element.

10. In a power-operated steering mechanism for motor vehicles having a steering arm, a fluid pressure-operated motor operatively connected with said arm, means for controlling the flow of fluid under pressure to said motor including a valve mechanism, means for connecting said motor and said mechanism, manually-operable means associated with said steering arm for controlling said valve mechanism, and means for dampening movement of said steering arm caused by road shocks comprising means associated with said connecting means for retarding the flow of fluid under pressure to said motor.

11. In a power-operated steering mechanism for motor vehicles having a steering arm, a fluid pressure-operated motor operatively connected with said arm, means for controlling the flow of fluid under pressure to said motor including a valve mechanism, means for connecting said motor and said mechanism, manually-operable means associated with said steering arm for controlling said valve mechanism, and means associated with said connecting means for variably retarding the flow of fluid under pressure to said motor.

12. In a power-operated steering mechanism for motor vehicles having a steering arm, a fluid pressure-operated motor operatively connected with said arm, means for controlling the flow of fluid under pressure to said motor including a valve mechanism, means for connecting said motor and said mechanism, manually-operable means associated with said steering arm for controlling said valve mechanism, and means associated with said connecting means for automatically variably retarding the flow of fluid under pressure to said motor in accordance with the rate of flow of fluid through said valve mechanism.

13. In a manually-controlled steering mechanism for motor vehicles having a steering arm, a fluid pressure-operated motor operatively connected with said arm, valve means for controlling said motor, manually-operable means having a part associated with said arm and adapted for movement in opposite directions for controlling said valve means, and vibration damping means associated with said valve-operating part comprising precompressed resilient means.

14. In a power-operated steering apparatus for vehicles having an oscillatable steering arm, steering mechanism connected thereto, a fluid motor operatively associated with said arm, a manually-controlled mechanism operable to establish a flow of fluid power to said motor, and means for variably decreasing the build-up of fluid power to said motor in accordance with an increase in the velocity of movement of said arm due to road shocks imparted thereto through said steering mechanism.

15. In a power-operated steering apparatus for vehicles having an oscillatable steering arm, steering mechanism connected thereto, a compressed air operated motor operatively associated with said arm, valve mechanism operable to establish a flow of compressed air to said motor, means including a part connected with said arm for controlling said valve mechanism, and means for variably decreasing the build-up of pressure in said motor in accordance with an increase in the velocity of movement of said arm and connected part due to external shocks imparted to said arm through said steering mechanism.

ROY S. SANFORD.